United States Patent
Weis et al.

(10) Patent No.: US 10,873,455 B2
(45) Date of Patent: Dec. 22, 2020

(54) TECHNIQUES FOR ENCRYPTION KEY ROLLOVER SYNCHRONIZATION IN A NETWORK

(71) Applicant: Cisco Technology, Inc., San Jose, CA (US)

(72) Inventors: Brian Weis, San Jose, CA (US); David M. Carrel, Tiburon, CA (US); Michael L. Sullenberger, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 124 days.

(21) Appl. No.: 16/005,990

(22) Filed: Jun. 12, 2018

(65) Prior Publication Data
US 2019/0288842 A1 Sep. 19, 2019

Related U.S. Application Data

(60) Provisional application No. 62/643,310, filed on Mar. 15, 2018.

(51) Int. Cl.
*H04L 29/06* (2006.01)
*H04L 9/12* (2006.01)
*H04L 9/08* (2006.01)

(52) U.S. Cl.
CPC .............. *H04L 9/12* (2013.01); *H04L 9/0827* (2013.01); *H04L 9/0891* (2013.01);
(Continued)

(58) Field of Classification Search
CPC ....... H04L 9/12; H04L 9/0891; H04L 63/062; H04L 63/0442; H04L 9/006;
(Continued)

(56) References Cited

U.S. PATENT DOCUMENTS 7,536,548 B1 5/2009 Batke et al.
7,957,320 B2 6/2011 König et al.
(Continued)

OTHER PUBLICATIONS

D. Maughan, M. Schertler, M. Schneider, and J. Turner. RFC 2408 (Proposed Standard), Nov. 1998.*
(Continued)

*Primary Examiner* — Matthew T Henning
(74) *Attorney, Agent, or Firm* — Edell, Shapiro & Finnan, LLC

(57) ABSTRACT

Techniques are presented for encryption key rollover synchronization in a network. In one embodiment, a method includes generating a new set of public-key encryption keys for a first network element. Based on the new set of public-key encryption keys, a set of new security associations between the first network element and each other network element in the network is generated. The method includes providing a new public key from the new set of public-key encryption keys to a network controller and using security associations associated with a previous set of public-key encryption keys for encrypted communication between the first network element and each other network element. Upon obtaining, from a second network element, traffic protected by a security association from the set of new security associations, the method includes using the new security associations for subsequent encrypted communication between the first network element and the second network element.

20 Claims, 8 Drawing Sheets

(52) U.S. Cl.
CPC ........ *H04L 63/0442* (2013.01); *H04L 63/062* (2013.01); *H04L 63/068* (2013.01); *H04L 63/16* (2013.01); *H04L 63/164* (2013.01)

(58) Field of Classification Search
CPC ......... H04L 9/0816–0819; H04L 9/083; H04L 9/30; H04L 63/061
See application file for complete search history.

(56) References Cited

U.S. PATENT DOCUMENTS

| | | |
|---|---|---|
| 7,962,743 B2 | 6/2011 | Fluhrer |
| 8,160,255 B2 | 4/2012 | Fluhrer |
| 2002/0071563 A1 | 6/2002 | Kurn et al. |
| 2003/0152235 A1 | 8/2003 | Cohen et al. |
| 2005/0289652 A1* | 12/2005 | Sharma ............ G06Q 20/40975 726/26 |
| 2007/0055877 A1* | 3/2007 | Persson ................ H04L 9/0891 713/171 |
| 2008/0137863 A1 | 6/2008 | Thomas |
| 2011/0228934 A1 | 9/2011 | Fukuda |
| 2013/0003975 A1 | 1/2013 | Fukuda et al. |
| 2013/0263249 A1 | 10/2013 | Song et al. |
| 2014/0208115 A1* | 7/2014 | Fukada ................ H04L 9/0891 713/171 |
| 2016/0344711 A1 | 11/2016 | Rokui et al. |

OTHER PUBLICATIONS

International Search Report and Written Opinion in counterpart International Application No. PCT/US2019/021083, dated May 14, 2019, 12 pages.

* cited by examiner

TECHNIQUES FOR ENCRYPTION KEY ROLLOVER SYNCHRONIZATION IN A NETWORK

CROSS-REFERENCE TO RELATED APPLICATION

This application claims benefit to U.S. Provisional Patent Application Ser. No. 62/643,310, entitled "Key Rollover Method for Controller-Based Data Encryption Solutions", filed on Mar. 15, 2018, the content of which application is incorporated herein in its entirety.

TECHNICAL FIELD

The present disclosure relates to network environments using encryption keys for encrypted communication.

BACKGROUND

Computer-based encryption techniques often require generating a cryptographic transform for use only by two parties to a communication session. Such cryptographic transforms may be used as pairwise keys that are applied to message-authentication codes, encryption, or for other purposes. For example, such a cryptographic transform is needed to establish an encrypted communication session between two network devices, such as routers.

DESCRIPTION OF EXAMPLE EMBODIMENTS

Overview

Techniques are presented herein for encryption key rollover synchronization in a network. A method for encryption key rollover synchronization includes generating a new set of public-key encryption keys for a first network element in a network comprising a plurality of network elements. Based on the new set of public-key encryption keys, a set of new security associations between the first network element and each other network element of the plurality of network elements in the network is generated. The method also includes providing a new public key from the new set of public-key encryption keys for the first network element to a network controller in communication with the plurality of network elements. The method includes using security associations associated with a previous set of public-key encryption keys to protect traffic for encrypted communication between the first network element and each other network element in the network. Upon obtaining, from a second network element of the plurality of network elements, traffic protected by a security association from the set of new security associations, the method includes using security associations from the set of new security associations for subsequent encrypted communication between the first network element and the second network element.

Example Embodiments

Modern network architectures use a controller to manage devices, such as a Software-Defined Networking (SDN) architecture, Software-Defined Wide-Area Network (SD-WAN) architecture, and other network architectures developed by standard bodies. A consistent design criteria in these controller-based network architectures is a complete (or near-complete) prohibition of direct peer-to-peer control protocols, such as, for example, Internet Key Exchange (IKEv2), which is a conventional method for devices to agree upon keying material to protect data communications. Typically, controller-based network architectures require all cryptographic policy and keying material to be distributed by a controller.

Figure 1:
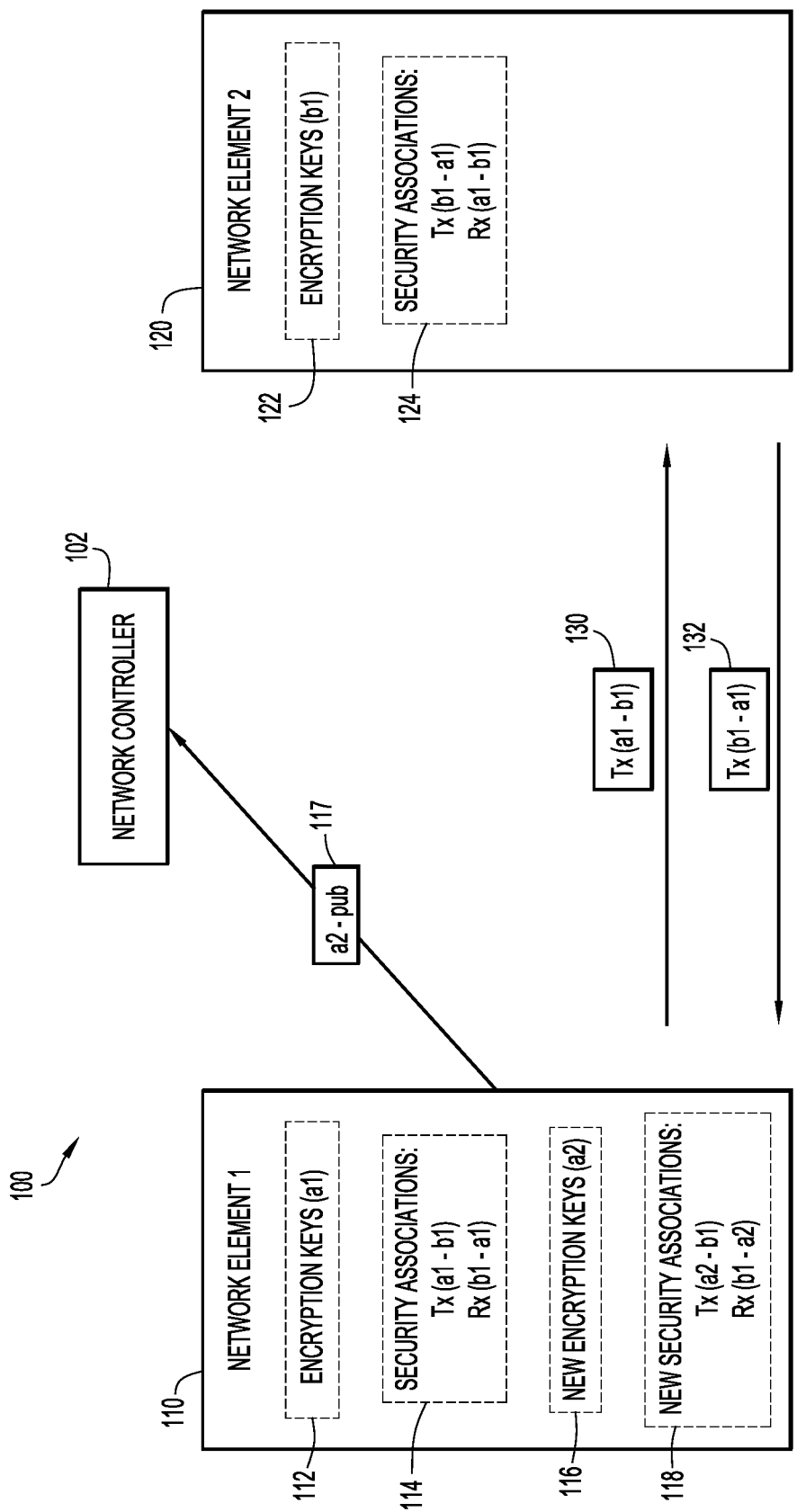
FIG. 1 is a diagram of a network in which techniques for encryption key rollover synchronization may be implemented, according to an example embodiment.

FIG. 1 illustrates a diagram of a network 100 in which techniques for encryption key rollover synchronization may be implemented, according to an example embodiment. In one embodiment, network 100 may be a controller-based network in which a network controller 102 is configured to communicate with and/or manage a plurality of network elements, including a first network element 110 and a second network element 120. FIG. 1 illustrates two representative network elements, first network element 110 and second network element 120, however, it should be understood that a network, such as network 100, may include any number of network elements. For example, in some cases, a network may include hundreds, thousands, tens of thousands, or more network elements.

In this embodiment, when network elements join or come online to network 100, each network element provides its encryption key public values to network controller 102. For example, when first network element 110 joins or comes online to network 100, first network element 110 generates a set of public-key encryption keys (a1) 112 and provides the public key value (not shown) to network controller 102. Similarly, when second network element 120 joins or comes online to network 100, second network element 120 generates a set of public-key encryption keys (b1) 122 and provides the public key value to network controller 102. In the example embodiments described herein, the encryption keys are keying material generated using Diffie-Hellman encryption schemes, however, encryption keys generated using other encryption schemes may also be used.

Upon receiving the public key values from first network element 110 and second network element 120, network controller 102 forwards or distributes these public key values to each other network element of the plurality of network elements (e.g., peers) in network 100. Each network element in network 100 may then generate and store a set of security associations (SAs) between the network element and each other network element (i.e., between each peer) using the public key values obtained from network controller 102.

For example, in this embodiment, first network element 110 generates and stores a set of security associations 114 using its encryption keys (a1) 112 and the public key value for second network element 120 (i.e., b1) that was obtained from network controller 102. Set of security associations 114 includes an outbound security association (e.g., Tx (a1-b1)) that first network element 110 may use when transmitting or providing data to second network element 120 during an encrypted communication session and an inbound security association (e.g., Rx (b1-a1)) that first network element 110 may use when receiving or obtaining data from second network element 120 during an encrypted communication session.

Second network element 120 also generates and stores a set of security associations 124 using its encryption keys (b1) 122 and the public key value for first network element 110 (i.e., a1) that was obtained from network controller 102. Set of security associations 124 includes an outbound security association (e.g., Tx (1)1-a1)) that second network element 120 may use when transmitting or providing data to first network element 110 during an encrypted communication session and an inbound security association (e.g., Rx (a1-1)1)) that second network element 120 may use when receiving or obtaining data from first network element 110 during an encrypted communication session.

A similar process of generating sets of security associations may be implemented for each additional network element in network 100. For example, if a third network element (not shown) were to join or come online to network 100, network controller 102 would distribute its encryption key public value to each other network element (e.g., first network element 110 and second network element 120). Each of first network element 110 and second network element 120 would then generate and store a set of security associations between itself and the newly-added third network element. Network controller 102 would also distribute network element 110 and 120 encryption key public values to this third network element and the third network element would generate and store separate sets of security associations between itself and each of first network element 110 and second network element 120. This process may repeat as necessary for any number of network elements in a network.

Encryption keys used by network elements in a network are subject to periodic rollover, during which the encryption keys for one or more network elements are changed. Accordingly, a reliable and efficient process for rollover of keying material in a network is needed. In a controller-based network architecture where the network controller (e.g., network controller 102) distributes the encryption key public values of the network elements, rollover of the encryption keys should occur without using a peer-to-peer control plane (i.e., between network elements). In addition, the rollover should occur without requiring any additional in-band communication, such as special bits that need to be set in Internet Protocol Security (IPsec) Security Parameter Index (SPI) values.

Performing encryption key rollover in a controller-based network, however, presents challenges. While each network element generates pairwise security associations (e.g., IPsec SAs) with each other peer network element, the rollover process may not be per-peer and there may not be direct per-peer synchronization. For example, a network element may have no direct knowledge or information of which peer network elements have received the new encryption key public values, nor of the rekey state of each peer network element. Therefore, a reliable encryption key rollover synchronization process that uses available indirect states is needed.

The example embodiments describe scenarios in which a controller distributes a single encryption key public value to each of a network element's peers (e.g., each other network element in the network). However, the principles of the example embodiments also apply when other encryption key distribution policies are used. For example, a network element could generate a unique encryption key public value per-peer (i.e., for each other network element) that is distributed by the network controller to each peer network element. Additionally, in another example, a network's separation policy (e.g., multi-tenant SD-WAN, or multi-department enterprises) may result in distinct sets of network elements sharing encryption key public values. The techniques for encryption key rollover synchronization described herein may also be used in these situations.

Referring back to FIG. 1, an encryption key rollover process (i.e., changing or rekeying of keying materials) in a controller-based network (e.g., network 100) is illustrated. In an example embodiment, the rollover process is initiated when a network element generates a new public-key encryption key pair and provides the new encryption key public value to the network controller. For example, in this embodiment, first network element 110 generates a new set of public-key encryption keys (a2) 116 and provides its new encryption key public value (a2-pub) 117 to network controller 102. First network element 110 also generates and stores a new set of security associations 118 between first network element 110 and each other network element in network 100 (e.g., second network element 120) using the new set of public-key encryption keys (a2) 116. The new sets of security associations 118 includes an outbound security association (e.g., Tx (a2-b1)) that first network element 110 may use when transmitting or providing data to second network element 120 during an encrypted communication session and an inbound security association (e.g., Rx (b1-a2)) that first network element 110 may use when receiving or obtaining data from second network element 120 during an encrypted communication session.

In this embodiment, while first network element 110 has rekeyed its encryption keys from the previous set of public-key encryption keys (a1) 112 to new set of public-key encryption keys (a2) 116, this key rollover has not yet been synchronized throughout network 100. Accordingly, until the rollover is synchronized, first network element 110 and each other network element (e.g., second network element 120) may continue to use security associations associated with the previous set of public-key encryption keys 112 for first network element 110 to protect traffic. For example, as shown in FIG. 1, an encrypted communication between first network element 110 and second network element 120 uses an outbound security association 130 (Tx (a1-b1)) from first network element 110 that is associated with set of security associations 114 using the previous set of public-key encryption keys (a1) 112 and an outbound security association 132 (Tx (b1-a1)) from second network element 120 that is associated with set of security associations 124 also using the previous encryption key public value for first network element 110.

Figure 2:
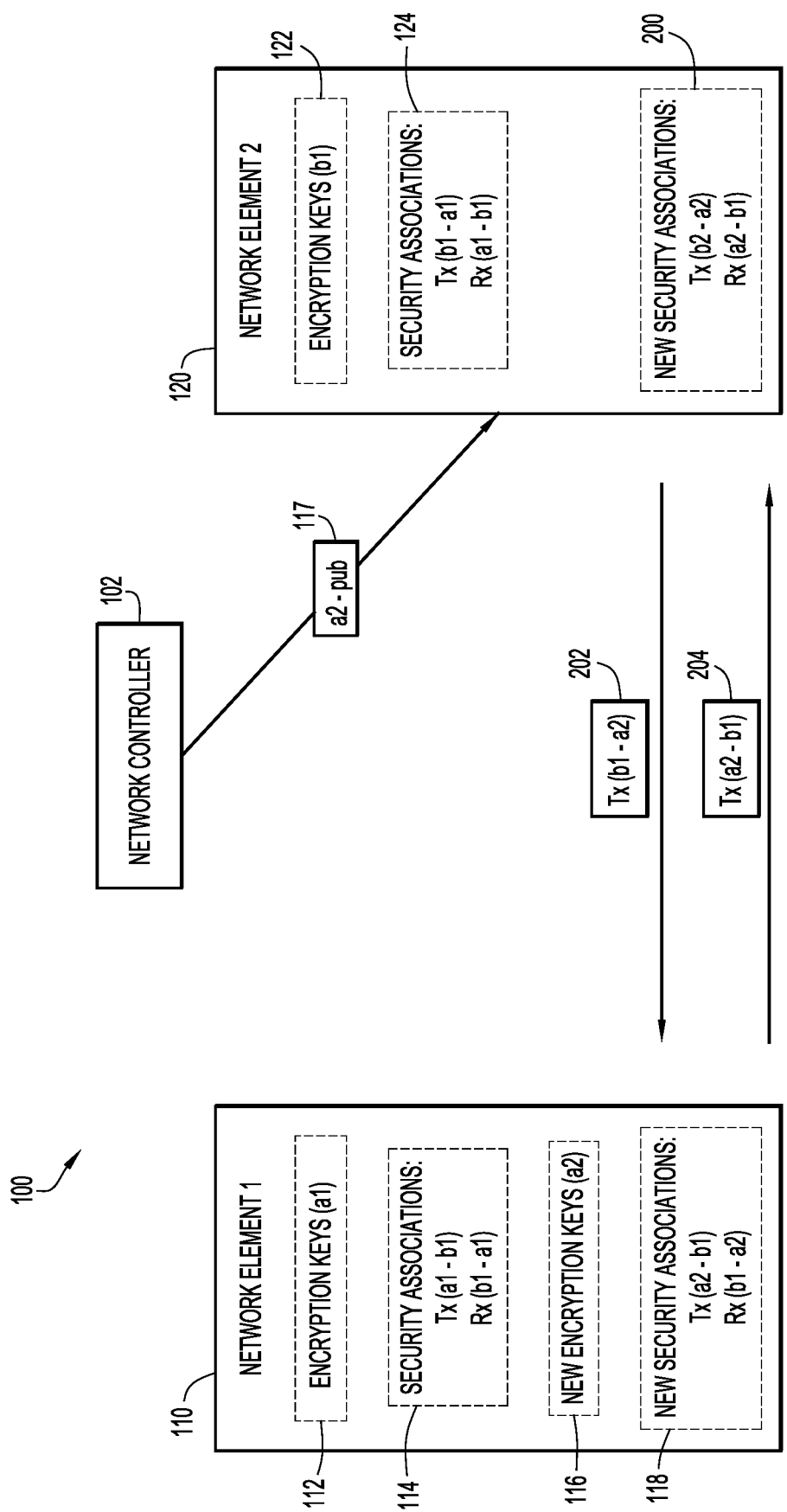
FIG. 2 is a diagram of a network in which techniques for encryption key rollover synchronization may be implemented, according to an example embodiment.

Referring now to FIG. 2, the encryption key rollover process continues as network controller 102 distributes new encryption key public value (a2-pub) 117 for first network element 110 to each other network element in network 100. In this case, network controller 102 distributes new encryption key public value (a2-pub) 117 to second network element 120. Upon obtaining new encryption key public value (a2-pub) 117 from network controller 102, second network element 120 generates and stores a new set of security associations 200 between second network element 120 and first network element 110 using new encryption key public value (a2-pub) 117. New set of security associations 200 includes an outbound security association (e.g., Tx (b1-a2)) that second network element 120 may use when transmitting or providing data to first network element 110 during an encrypted communication session and an inbound security association (e.g., Rx (a2-b1)) that second network element 120 may use when receiving or obtaining data from first network element 110 during an encrypted communication session.

Upon obtaining the new encryption key public value and generating new set of security associations 200, second network element 120 may use these new set of security associations 200 to protect traffic for subsequent encrypted communication with first network element 110. For example, as shown in FIG. 2, an encrypted communication between second network element 120 and first network element 110 uses an outbound security association 202 (Tx (b1-a2)) from second network element 120 to first network element 110 that is associated with new set of security associations 200 using new encryption key public value (a2-pub) 117. Until first network element 110 observes traffic from second network element 120 that uses a security association from new set of security associations 200, first network element 110 will continue to use outbound security association 130 (Tx (a1-b1)) associated with set of security associations 114 using the previous set of public-key encryption keys (a1) 112. Upon receiving, at first network element 110, traffic from second network element 120 that is protected using a security association from new set of security associations 200, first network element 110 may switch to using security associations from new set of security associations 118. For example, first network element 110 may protect traffic to second network element 120 using an outbound security association 204 (Tx (a2-b1)) that is associated with new set of security associations 118 also using the new encryption keys (a2) 116 for first network element 110.

The encryption key rollover process for first network element 110 completes when all peers of first network element 110 (i.e., each other network element in the network) have been observed by first network element 110 to have transmitted or provided traffic (e.g., packets or datagrams) protected using security associations from the new sets of security associations that were generated using the new encryption key public value (a2-pub) 117 for encrypted communication with first network element 110. For example, in this embodiment, network 100 includes only one peer network element (e.g., second network element 120), therefore, encryption key rollover process for first network element 110 is completed when first network element 110 observes that second network element 120 uses outbound security association 202 (Tx (b1-a2)) that is associated with new set of security associations 200 to protect traffic for encrypted communication with first network element 110. In other embodiments with a larger number of network elements, the rollover process completes when each network element receives the new encryption key public value, generates and stores new sets of security associations using the new encryption key public value, and observes that other peer network elements begin to transmit or provide traffic protected using the new security associations for encrypted communication with the network element that changed its encryption keys (i.e., initiated the encryption key rollover process).

The principles of the present embodiments described herein implement techniques for encryption key rollover synchronization by managing public-key encryption key pairs at an application level and also managing the data security state (e.g., IPsec security associations) created using the encryption key pairs. In an example embodiment, encryption key pair management (e.g., Diffie-Hellman (DH) pairs) is handled separately from the data security state kept with each data plane peer (i.e., each network element) because the data security state is shared across those peers (i.e., between network elements). This separation of encryption key pair management and data security state peer management may be seen with reference to FIG. 3.

Figure 3:
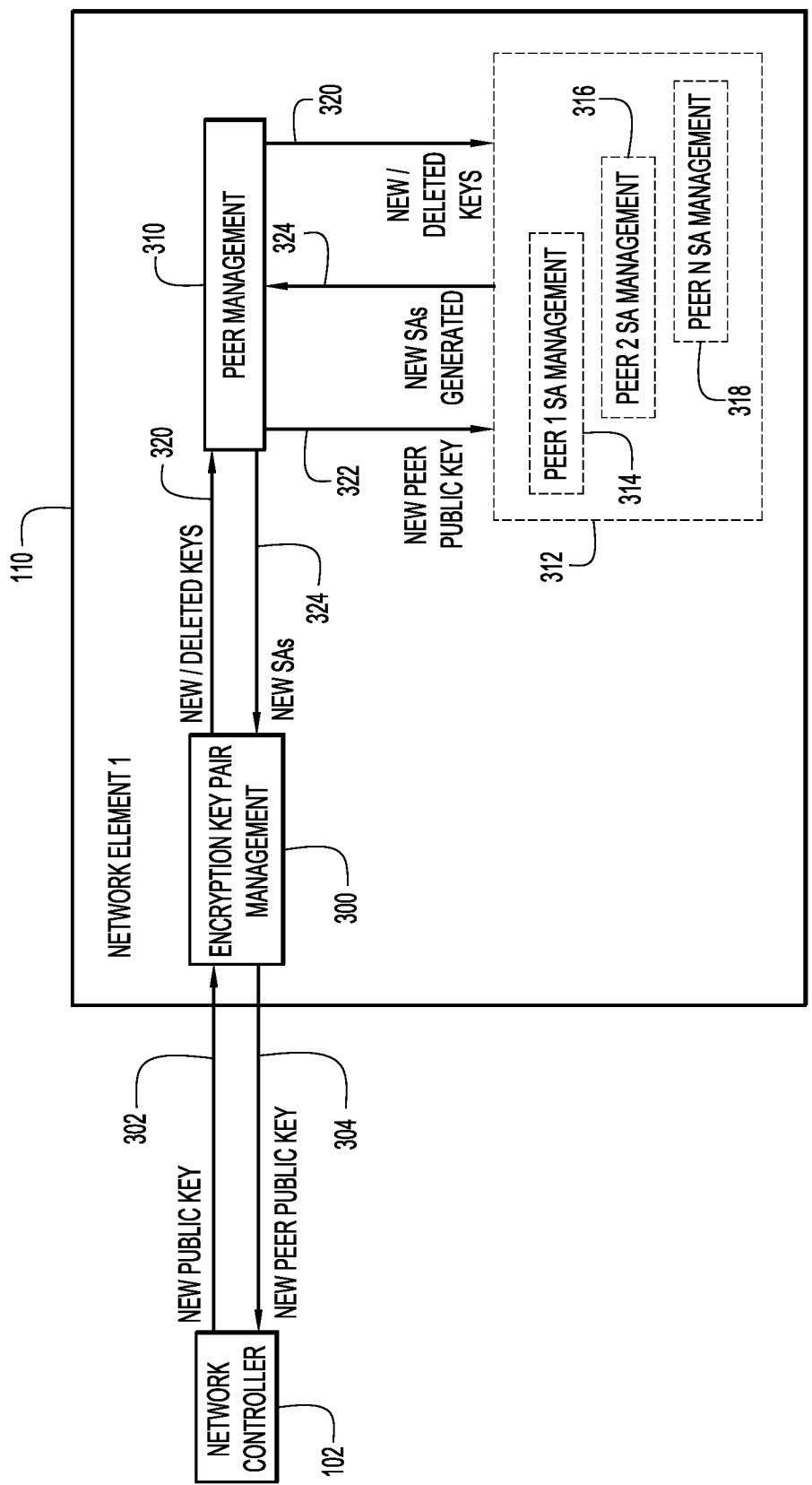
FIG. 3 is a logic diagram of a network element in which techniques for encryption key rollover synchronization may be implemented, according to an example embodiment.

FIG. 3 is a logic diagram of first network element 110 in which techniques for encryption key rollover synchronization may be implemented, according to an example embodiment. First network element 110 is representative of each network element of a plurality of network elements that may be present in a network, such as network 100. In this embodiment, first network element 110 includes an encryption key pair management module 300 that is configured to manage generation and deletion of encryption key pairs. Encryption key pair management module 300 is also configured to provide or transmit new local encryption key public values 302 to network controller 102, as well as being configured to obtain or receive new peer encryption key values 304 (i.e., from other network elements) from network controller 102 when those peer network elements rekey or rollover their encryption keys.

In this embodiment, first network element 110 also includes a peer management module 310 that includes a set of peer security association (SA) management modules 312. Set of peer SA management modules 312 includes a separate SA management module for each peer (i.e., each other network element in the network). In this embodiment, set of peer SA management modules 312 includes a first peer SA management module 314 that is configured to manage sets of security associations between first network element 110 and a first peer (e.g., second network element 120). In a network that includes a plurality of network elements, set of peer SA management modules 312 also includes a second peer SA management module 316 that is configured to manage sets of security associations between first network element 110 and a second peer, and additional peer SA management modules up to an nth peer SA management module 318 that is configured to manage sets of security associations between first network element 110 and each additional network element up to an nth peer network element. The set of peer SA management modules 312 is coordinated by peer management module 310.

In this embodiment, each peer SA management module 314, 316, 318 is configured to manage the data security state for a particular peer network element. For example, peer management module 310 provides as inputs to set of peer SA management modules 312, new local encryption keys 320, which may be provided from encryption key pair management module 300, and new peer encryption key public values 322, which may be provided from network controller 102. Using new local encryption keys 320 and/or new peer encryption key public values 322, set of peer SA management modules 312 may be updated accordingly by peer SA management modules 314, 316, 318 generating new sets of security associations 324 for each corresponding peer network element. The new sets of security associations 324 that are generated by set of peer SA management modules 312 may then be provided to peer management module 310 for use by first network element 110 during encrypted communication with other network elements.

Additionally, peer management module 310 may also provide as inputs to set of peer SA management modules 312 any deleted local encryption keys 320, so that corresponding security associations using previous sets of encryption keys may be deleted.

According to the principles of the example embodiments, peer SA management modules 314, 316, 318 may use a set of rules to ensure a reliable data plane security rollover synchronization in network 100. For example, because encryption key pair state (e.g., managed by encryption key pair management module 300) is independent from the peer data security state (e.g., managed by peer management module 310) and there is no direct peer-to-peer state exchange (i.e., between network elements), the challenge during an encryption key rollover process is for a network element to choose the correct outbound security association (e.g., transmit—Tx SA) for the network element to use during encrypted communication with other network elements. This may be because of a rollover of the encryption key pair used by either the local network element, the peer network element(s), or both in the event of a simultaneous rollover or rekeying process.

Figure 4:
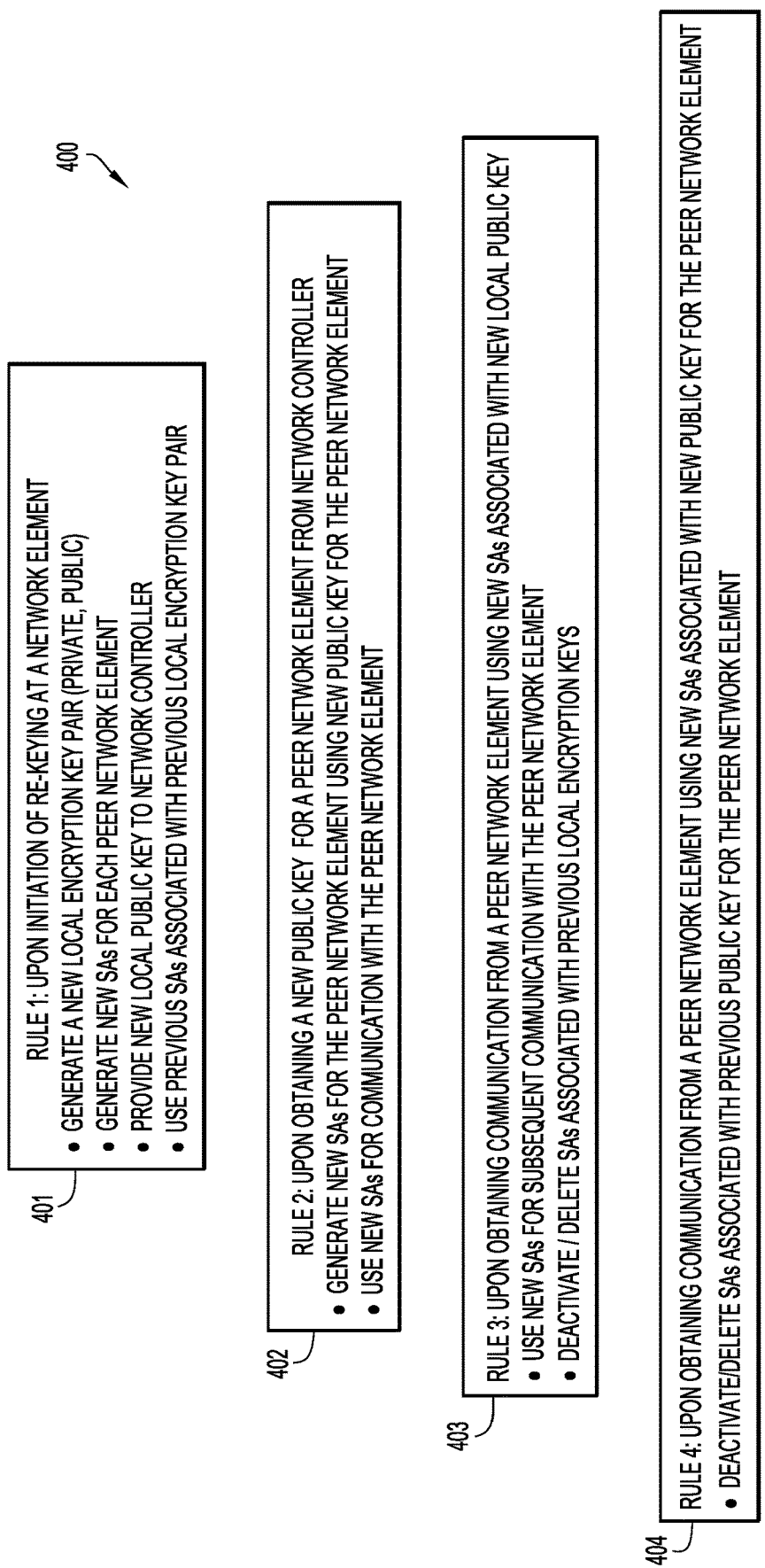
FIG. 4 is a diagram of rules for encryption key rollover synchronization in a network, according to an example embodiment.

FIG. 4 is a diagram illustrating a set of rules 400 used to provide encryption key rollover synchronization in a network, according to an example embodiment. Set of rules 400 may be used by a network element to ensure that encryption key rollover in a network is synchronized and reliable. A number of events may cause a network element to re-calculate which security associations should be used to protect traffic provided or transmitted to a peer network element. For example, events that may cause a re-calculation of security associations used by first network element 110 may include obtaining or receiving a new local encryption key pair from encryption key pair management module 300, obtaining or receiving a new encryption key public value for a peer network element from network controller 102, and/or obtaining or receiving notification that the peer network element has begun to provide or transmit traffic protected using security associations that were generated based on a new set of encryption keys.

In response to each of these described events, the decision process for a network element (e.g., first network element 110) to determine which security associations to use to protect traffic includes two parts. First, the network element retrieves or determines from stored data the outbound security associations (i.e., Tx SAs) associated with a peer network element's most recently distributed encryption key public value. Second, if there is more than one outbound security association that matches the peer network element's most recently distributed encryption key public value, the network element selects the outbound security association that was most recently validated. In this case, a validated outbound security association (i.e., Tx SA) is a security association that was generated using the local public-key encryption keys that were used to generate a corresponding inbound security association (i.e., Rx SA) that the peer network element has used to protect a packet sent to the network element during encrypted communication. Thus, the inbound security association (i.e., Rx SA) used to protect traffic provided by the peer network element confirms whether or not the peer network element has received or obtained a new encryption key public value for the network element.

Set of rules 400 may be followed by a network element while implementing this two-part decision process to ensure that no packets are dropped. Set of rules 400 are followed independently for each peer connection (i.e., for each combination of network element to network element).

In this embodiment, set of rules 400 includes a first rule 401. First rule 401 is directed to what a network element that is initiating a rollover or rekeying of its encryption keys should do to rekey with a peer network element. For example, first rule 401 may be followed upon initiation of a rekeying or rollover of keying material (e.g., encryption keys) at a network element, such as first network element 110. As part of the initiation of the rekeying or rollover, the network element generates a new local public-key encryption key pair (including a private key value and a public key value). For example, as shown in FIG. 3, a new set of public-key encryption keys for first network element 110 may be generated by encryption key pair management module 300.

Next, first rule 401 includes generating a new set of security associations for each peer network element (i.e., each other network element in the network) using the new local encryption key private value and each peer network element's encryption key public value. For example, as shown in FIG. 3, first network element 110 may generate new sets of security associations for each peer network element using a corresponding peer SA management module from set of peer SA management modules 312 (e.g., peer SA management modules 314, 316, 318) and coordinated by peer management module 310.

In some embodiments, if a peer network element is also in the midst of a rekeying or rollover of its encryption keys (i.e., a simultaneous rollover, as described in reference to FIG. 6 below), the generation of a new set of security associations for that peer network element may result in generating two new sets of security associations for that peer network element: one using the peer network element's previous encryption key public value and another using the peer network element's new encryption key public value.

Next, first rule 401 further includes providing the new local encryption key public value for the network element to the network controller. For example, first network element 110 provides its new encryption key public value to network controller 102. As previously described, network controller 102 may then distribute this new encryption key public value for first network element 110 to each other network element in network 100.

Finally, the network element follows the two-part decision process to determine which security associations to use to protect traffic for encrypted communication with other network elements. According to the scenario described under first rule 401, the result of the decision is for the network element to continue to use security associations associated with the previous set of public-key encryption keys (i.e., using the set of security associations generated using the network element's previous set of public-key encryption keys before re-keying). This is the result because the network element has not yet received or obtained traffic using a security association that uses its new local encryption key public value from that peer network element. In other words, the security associations generated using the network element's new set of public-key encryption keys have not yet been validated by receiving traffic protected using the new security associations. Therefore, the network element continues using the previous set of security associations for a peer network element until obtaining a security association from that peer network element that is associated with the new set of security associations, as will be described in detail below in reference to a third rule 403.

Set of rules 400 further includes a second rule 402. Second rule 402 is directed to what a network element should do when it receives a new encryption key public value for a peer network element from a network controller. For example, second rule 402 may be followed upon obtaining at a network element, such as first network element 110, a new encryption key public value for a peer network element, such as second network element 120, from network controller 102. According to second rule 402, the network element generates and stores a new set of security associations for the peer network element using the new peer encryption key public value and the network element's own encryption keys (e.g., local encryption key private value). For example, as shown in FIG. 3, first network element 110 may generate a new set of security associations for the peer network element using the corresponding peer SA management module from set of peer SA management modules 312 for that peer network element. In this example, first peer SA management module 314 that is configured to manage sets of security associations between first network element 110 and second network element 120.

In some embodiments, if the local network element (e.g., first network element 110) is also in the midst of a rekeying or rollover of its encryption keys (i.e., a simultaneous rollover, as described in reference to FIG. 6 below), the generation of a new set of security associations for that peer network element using the new peer encryption key public value may result in generating two new sets of security associations for that peer network element: one using the local network element's previous encryption key private value and another using the local network element's new encryption key private value.

Next, the network element follows the two-part decision process (described above) to determine which security associations to use for encrypted communication with the peer network element. According to the scenario described under second rule 402, the result of the decision is for the network element to use security associations from the new sets of security associations for encrypted communication with the peer network element. In the case where there may be more than one new set of security associations, the network element selects the new set of security associations that was most recently validated. In other words, using a security association from the set of security associations associated with the peer network element's public key value (new or old) that was used to protect the last received traffic from that peer network element.

Additionally, in some embodiments, second rule 402 may further include an optional step of deleting or deactivating any outbound security associations stored at the network element that were generated using the peer network element's previous encryption key public value.

Next, set of rules 400 includes a third rule 403. Third rule 403 is directed to what a network element that has rekeyed should do when it first receives encrypted communication from another network element using a security association from the new set of security associations that were generated using the network element's new encryption key public value. For example, third rule 403 may be followed upon obtaining at a network element, such as first network element 110, encrypted communication from a peer network element, such as second network element 120, that uses a security association from a new set of security associations that use the network element's new encryption key public value (e.g., outbound security association 202 (Tx (b1-a2)) from second network element 120 that is associated with new set of security associations 200 using new encryption key public value (a2-pub) 117). In this example, outbound security association 202 (Tx (b1-a2)) used to protect traffic from second network element 120 matches a corresponding inbound security association (Rx (b1-a2)) from new set of security associations 118 stored at first network element 110.

According to third rule 403, the network element may then use security associations from the new set of security associations to protect traffic for subsequent encrypted communication with the peer network element. That is, the network element has received or obtained validation for the new set of security associations for encrypted communication with the peer network element using its new public-key encryption keys. Third rule 403 also includes setting a timer at the network element upon obtaining traffic protected using the security association from the new set of security associations from the peer network element. Upon expiration of the timer, the security associations stored at the network element that are associated with the previous public-key encryption keys for the network element are deleted or deactivated.

For example, as shown in FIG. 2, after receiving traffic protected using outbound security association 202 (Tx (b1-a2)) from second network element 120, first network element 110 may set a timer that, upon expiration, will cause first network element to delete or deactivate set of security associations 114 that are associated with previous set of public-key encryption keys 112. In embodiments with a plurality of network elements, first network element 110 may delete or deactivate previous sets of security associations for each peer network element using a corresponding peer SA management module from set of peer SA management modules 312 (e.g., peer SA management modules 314, 316, 318) and coordinated by peer management module 310.

According to third rule 403, the previous sets of security associations are not immediately deleted or deactivated because during the rollover or rekeying process, in-flight packets may be traversing within network 100 that are encrypted using the previous set of security associations. By initiating a timer, the in-flight packets using the previous set of security associations can have time to reach the network element before the previous set of security associations are deleted or deactivated.

Set of rules 400 also includes a fourth rule 404. Fourth rule 404 is directed to what a network element should do when it first receives encrypted communication from another network element that has undergone rekeying or rollover using a security association from the new set of security associations that were generated using the rekeyed network element's new encryption keys. For example, fourth rule 404 may be followed upon obtaining or receiving at a network element, such as second network element 120, encrypted communication from a peer network element, such as first network element 110, that uses a security association from a new set of security associations that use the peer network element's new public-key encryption keys (e.g., outbound security association 204 (Tx (a2-b1)) from first network element 110 that is associated with new set of security associations 118 using new public-key encryption keys 116). In this example, traffic protected using outbound security association 204 (Tx (a2-b1)) from first network element 110 matches a corresponding inbound security association (Rx (a2-b1)) from new set of security associations 200 stored at second network element 120 that use first network element's new encryption key public value (a2-pub) 117.

Upon obtaining or receiving the encrypted communication from the peer network element that uses a security association from a new set of security associations that use the peer network element's new public-key encryption keys, the network element may delete or deactivate the set of security associations associated with the previous set of public-key encryption keys for the peer network element. For example, in reference to FIG. 2, upon receiving traffic protected using outbound security association 204 (Tx (a2-b1)) from first network element 110, second network element 120 may delete or deactivate set of security associations 124 associated with first network element's previous set of public-key encryption keys (e.g., encryption keys 112 (a1)).

Fourth rule 404 may also include setting a timer at the network element upon obtaining or receiving traffic protected by the security association from the new set of security associations from the peer network element before deleting or deactivating the set of security associations associated with the previous set of public-key encryption keys for the peer network element. As described above with reference to third rule 403, the timer allows in-flight packets using the previous set of security associations to reach the network element before the previous set of security associations are deleted or deactivated.

Figure 5:
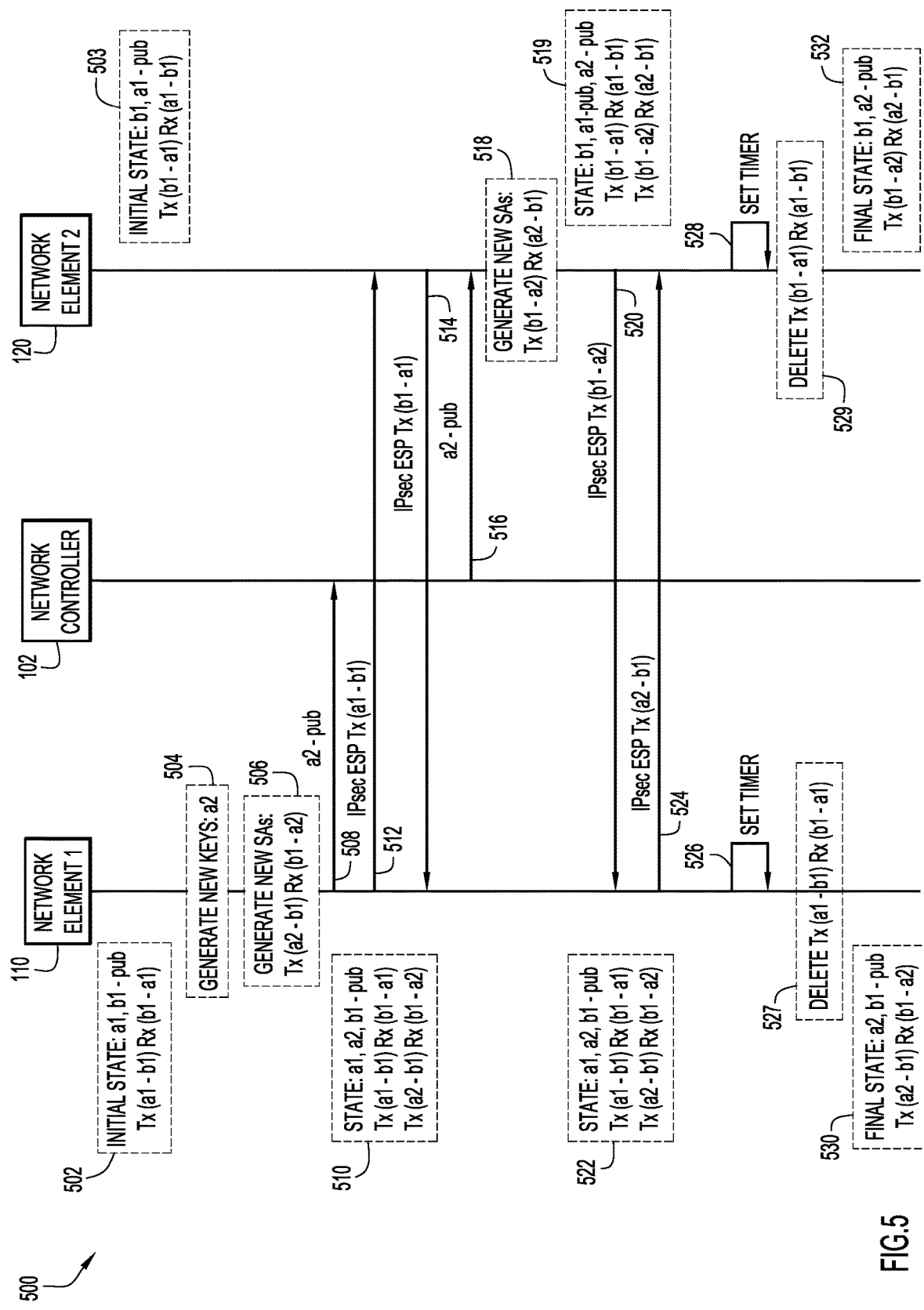
FIG. 5 is a ladder diagram illustrating operations for implementing techniques for encryption key rollover synchronization in a network with a single rekeying, according to an example embodiment.
Figure 6:
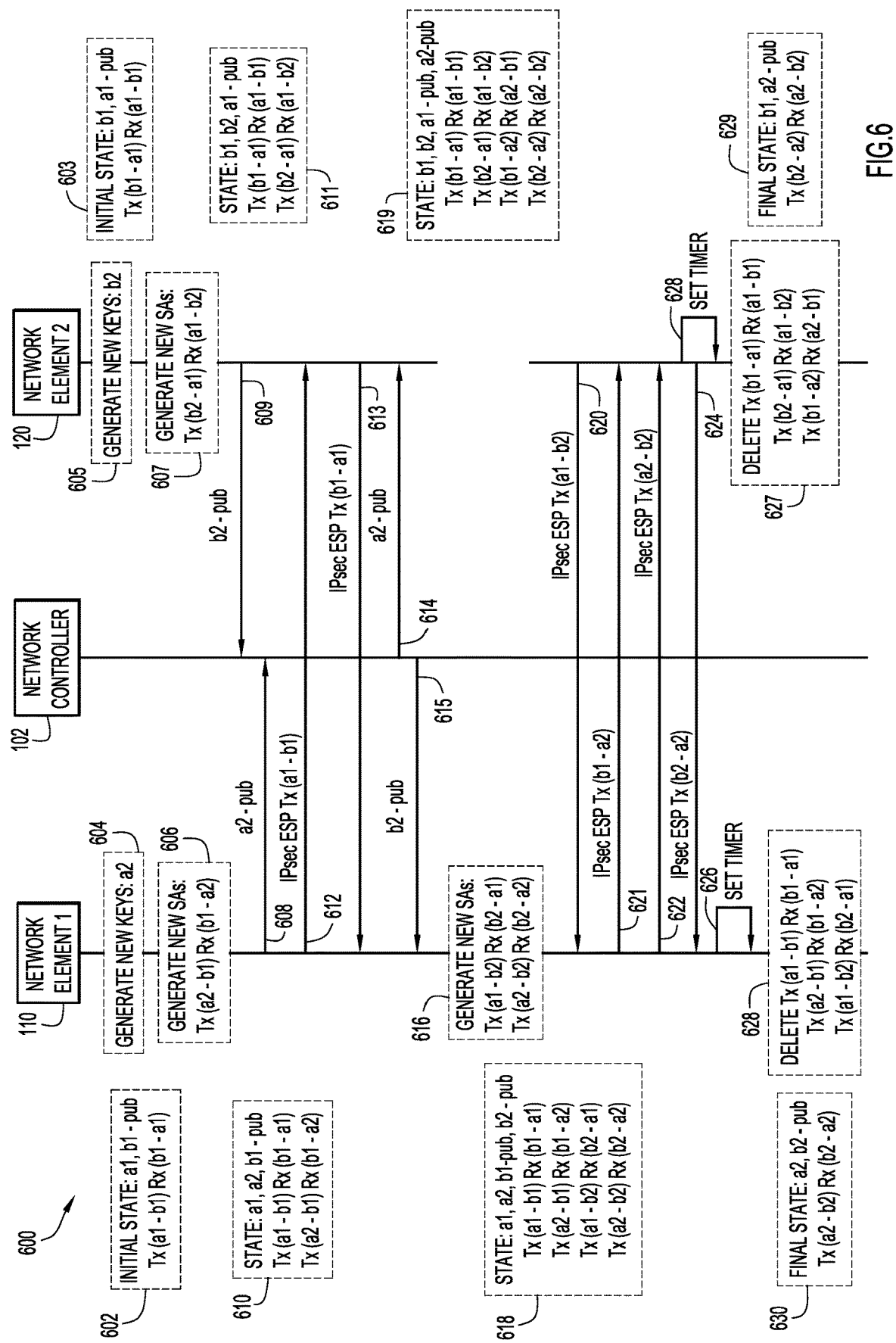
FIG. 6 is a ladder diagram illustrating operations for implementing techniques for encryption key rollover synchronization in a network with simultaneous rekeying, according to an example embodiment.
Figure 7:
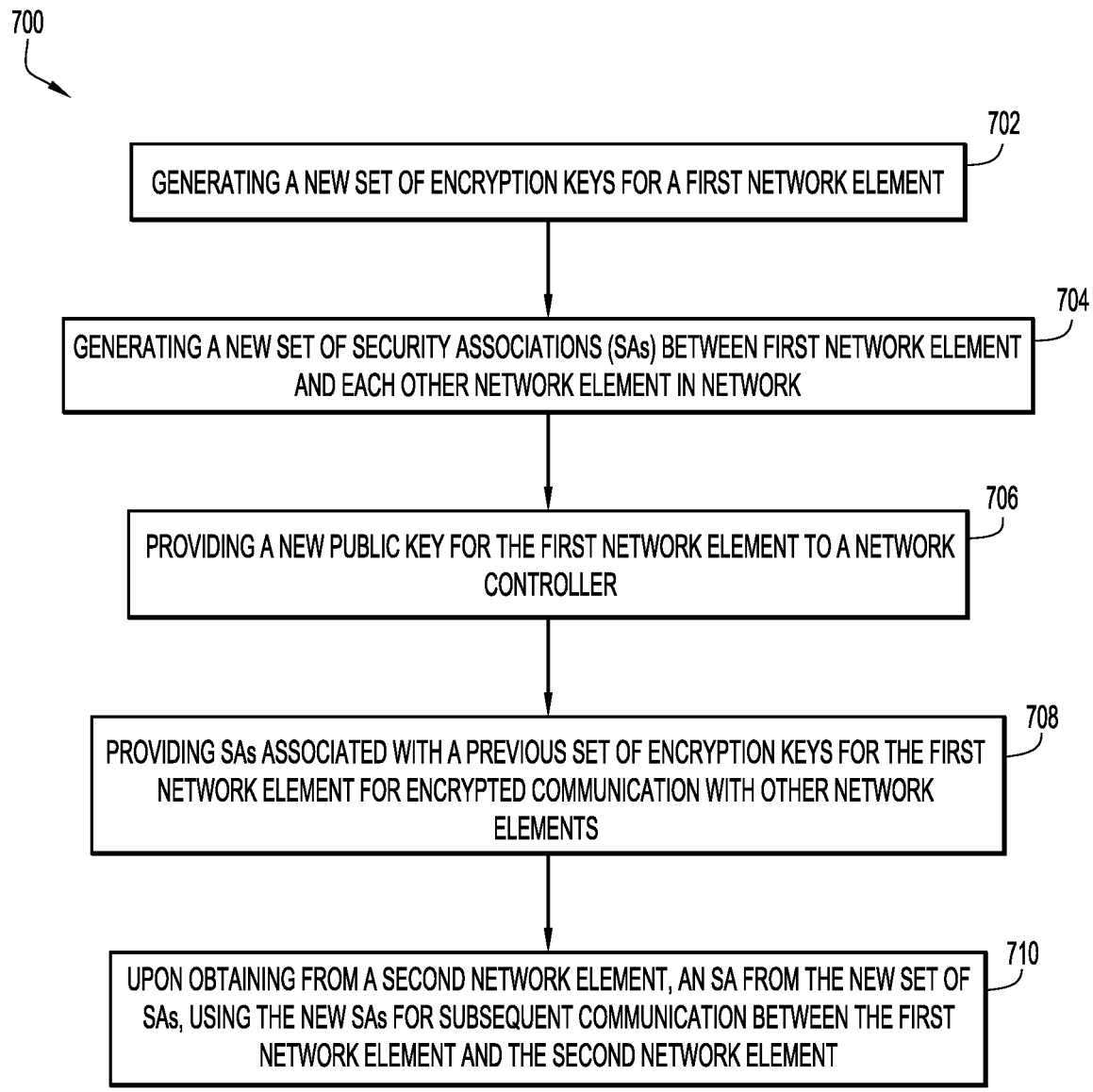
FIG. 7 is a flowchart of a method for implementing techniques for encryption key rollover synchronization in a network, according to an example embodiment.

The set of rules 400 may also be described in reference to operations shown in FIGS. 5 and 6 during example rekeying or rollover process scenarios and in reference to operations of method 700, shown in FIG. 7.

Turning first to FIG. 5, a ladder diagram 500 is illustrated in which operations for implementing techniques for encryption key rollover synchronization in network 100 with a single network element rekeying or rollover is shown according to an example embodiment. In this embodiment, a single network element (e.g., first network element 110) of a plurality of network elements in network 100 is initiating a rekeying or rollover of its public-key encryption keys. First network element 110 has an initial state 502 that includes its local encryption keys (a1), peer encryption key public value (b1-pub) for second network element 120, and a set of security associations (Tx (a1-b1), Rx (b1-a1)). Second network element 120 has an initial state 503 that includes its local encryption keys (b1), peer encryption key public value (a1-pub) for first network element 110, and a set of security associations (Tx (b1-a1), Rx (a1-b1)).

Upon initiation of the rekeying or rollover of keying material (e.g., public-key encryption keys) at first network element 110, at an operation 504, a new set of public-key encryption keys are generated (a2) for first network element 110, including a private value and a public value. At an operation 506, a set of new security associations (Tx (a2-b1), Rx (b1-a2)) are generated between first network element 110 and second network element 120 based on the new set of public-key encryption keys. Next, at an operation 508, first network element 110 provides or transmits the new encryption key public value (a2-pub) to network controller 102. At this point, first network element 110 has a current state 510 that includes both of its local public-key encryption keys (a1, a2), peer encryption key public value (b1-pub) for second network element 120, and two sets of security associations, including the previous set of security associations (Tx (a1-1)1), Rx (b1-a1)) and the set of new security associations (Tx (a2-b1), Rx (b1-a2)).

Encrypted communication between first network element 110 and second network element 120 is conducted using the previous set of security associations (Tx (a1-b1), Rx (b1-a1)). For example, as shown in FIG. 5, first network element 110 and second network element 120 exchange an IPsec Encapsulating Security Payload (ESP) at operations 512, 514 using previous set of security associations (Tx (a1-b1), Rx (1)1-a1)). In this embodiment, operations 504, 506, 508, 512, 514 have been implemented in accordance with first rule 401 of set of rules 400, described above.

Next, at an operation 516, network controller 102 provides or transmits the new encryption key public value (a2-pub) for first network element 110 to second network element 120. Upon obtaining or receiving the new encryption key public value (a2-pub), at an operation 518, second network element 120 generates and stores a set of new security associations (Tx (b1-a2), Rx (a2-b1)) between second network element 120 and first network element 110 based on the new encryption key public value (a2-pub) for first network element 110. At this point, second network element 120 has a current state 519 that includes its local public-key encryption keys (b1), previous peer encryption key public value (a1-pub) for first network element 110, new peer encryption key public value (a2-pub) for first network element 110, and two sets of security associations, including the previous set of security associations (Tx (b1-a1), Rx (a1-b1)), and the set of new security associations (Tx (b1-a2), Rx (a2-b1)). Encrypted communication transmitted from second network element 120 to first network element 110 is conducted using an outbound security association from the set of new security associations (e.g., Tx (b1-a2)), while encrypted communication may be received at first network element 110 using an inbound security association from either set of security associations (e.g., Rx (a2-b1), or Rx (a1-b1)). For example, as shown in FIG. 5, second network element 120 sends an IPsec ESP packet at an operation 520 that has been protected using the outbound security association from the set of new security associations (e.g., Tx (b1-a2)). In this embodiment, operations 518, 520 have been implemented in accordance with second rule 402 of set of rules 400, described above.

Meanwhile, at first network element 110, upon obtaining or receiving encrypted communication provided from second network element 120 at operation 520 that is protected using an outbound security association (e.g., Tx (b1-a2) from the set of new security associations (Tx (b1-a2), Rx a2-b1)) using new public-key encryption keys (a2), subsequent encrypted communication from first network element 110 to second network element 120 is conducted using the outbound security association (e.g., Tx (a2-b1) from the set of new security associations (Tx (a2-b1), Rx (b1-a2)). For example, as shown in FIG. 5, first network element 110 sends an IPsec ESP packet at an operation 524 using the outbound security association Tx (a2-b1). At this point, first network element 110 has a current state 522 that is similar to state 510 and includes its new local encryption keys (a2), previous local encryption keys (a1), peer encryption key public value (b1-pub) for second network element 120, and the two sets of security associations, including the previous set of security associations (Tx (a1-b1), Rx (b1-a1)) and the set of new security associations (Tx (a2-b1), Rx (b1-a2)).

Additionally, first network element 110 may also set a timer at an operation 526. Upon expiration of the timer, the previous set of security associations (Tx (a1-b1), Rx (1)1-a1)) stored at first network element 110 that are associated with the previous public-key encryption keys (a1) are deleted or deactivated at an operation 527. Additionally, in some embodiments, the timer set at operation 526 may be initiated after operation 520 and before operation 524. Upon expiration of the timer set at operation 526 and the deletion or deactivation of the previous set of security associations at operation 527, first network element 110 has a final state 530 that includes its new local public-key encryption keys (a2), peer encryption key public value (b1-pub) for second network element 120, and the set of new security associations (Tx (a2-b1), Rx (b1-a2)). In this embodiment, operations 524, 526, 527 have been implemented in accordance with third rule 403 of set of rules 400, described above.

At second network element 120, upon obtaining or receiving encrypted communication provided from first network element 110 at operation 524 that uses an outbound security association (e.g., Tx (a2-b1)) that matches with an inbound security association (e.g., Rx (a2-b1)) from the set of new security associations (Tx (b1-a2), Rx (a2-b1)) using new encryption key public value (a2-pub), second network element 120 may delete or deactivate all previous sets of security associations (Tx (b1-a1), Rx (a1-b1)) stored at second network element 120 that are associated with the previous public-key encryption keys (a1) for first network element 110 at an operation 529. As described above, in some embodiments, second network element 120 may set a timer at an operation 528 prior to deleting or deactivating the previous set of security associations at operation 529. Upon expiration of the timer, operation 529 may proceed.

Upon expiration of the timer set at operation 528 and the deletion or deactivation of the previous set of security associations at operation 529, second network element 120 has a final state 532 that includes its local encryption keys (b1), peer new encryption key public value (a2-pub) for first network element 110, and the set of new security associations (Tx (b1-a2), Rx (a2-b1)). In this embodiment, operations 528, 529 have been implemented in accordance with fourth rule 404 of set of rules 400, described above. As shown in FIG. 5, both first network element 110 and second network element 120 reach corresponding final states 530, 532 that include the new encryption keys for first network element and the associated set of new security associations using the new encryption keys. Thus, encryption key rollover synchronization in network 100 is achieved for a single rollover or rekeying event (i.e., rollover of encryption keys for first network element 110).

Turning now to FIG. 6, a ladder diagram 600 is illustrated in which operations for implementing techniques for encryption key rollover synchronization in network 100 with a simultaneous rekeying or rollover is shown according to an example embodiment. In this embodiment, multiple network elements (e.g., first network element 110 and second network element 120) of a plurality of network elements in network 100 are initiating a rekeying or rollover of their public-key encryption keys at the same time (e.g., a simultaneous rekeying or rollover). First network element 110 has an initial state 602 that includes its local public-key encryption keys (a1), peer encryption key public value (b1-pub) for second network element 120, and a set of security associations (Tx (a1-b1), Rx (1)1-a1)). Second network element 120 has an initial state 603 that includes its local public-key encryption keys (1)1), peer encryption key public value (a1-pub) for first network element 110, and a set of security associations (Tx (b1-a1), Rx (a1-b1)).

Upon initiation of the rekeying or rollover of keying material (e.g., public-key encryption keys) at first network element 110, at an operation 604, a new set of public-key encryption keys are generated (a2) for first network element 110, including a private value and a public value. At an operation 606, a set of new security associations (Tx (a2-b1), Rx (b1-a2)) are generated at first network element 110 to use for protecting traffic with second network element 120 based on the new set of public-key encryption keys. At this point, first network element 110 uses second network element's previous encryption key public value (b1-pub) because it has not yet received the new encryption key public value for second network element 120 from network controller 102. Next, at an operation 608, first network element 110 provides or transmits the new encryption key public value (a2-pub) to network controller 102.

In this embodiment, second network element 120 is also initiating a rekeying or rollover of its encryption keys (i.e., a simultaneous rekeying or rollover). Upon initiation of the rekeying or rollover at second network element 120, at an operation 605, a new set of public-key encryption keys are generated (b2) for second network element 120, including a private value and a public value. At an operation 607, a set of new security associations (Tx (b2-a1), Rx (a1-b2)) are generated at second network element 120 to use for protecting traffic with first network element 110 based on the new set of public-key encryption keys for second network element 120 and the encryption key public value for first network element 110 (a1-pub). At this point, second network element 120 uses first network element's previous encryption key public value (a1-pub) because it has not yet received the new encryption key public value for first network element 110 from network controller 102. Next, at an operation 609, second network element 120 provides or transmits its new encryption key public value (b2-pub) to network controller 102.

At this point, first network element 110 has a current state 610 that includes both of its local encryption keys (a1, a2), peer encryption key public value (b1-pub) for second network element 120, and two sets of security associations, including the previous set of security associations (Tx (a1-b1), Rx (b1-a1)) and the set of new security associations (Tx (a2-b1), Rx (b1-a2)). Second network element 120 has a current state 611 that includes both of its local encryption keys (b1, b2), peer encryption key public value (a1-pub) for first network element 110, and two sets of security associations, including the previous set of security associations (Tx (b1-a1), Rx (a1-b1) and the set of new security associations (Tx (b2-a1, Rx (a1-2)).

Encrypted communication from first network element 110 to second network element 120 is conducted using the outbound security association from the previous set of security associations (Tx (a1-b1) stored at first network element 110. For example, as shown in FIG. 6, first network element 110 and second network element 120 exchange IPsec ESP packets at operations 612, 613 that are protected using previous set of security associations (Tx (a1-b1)) and (Tx (b1-a1), respectively). In this embodiment, operations 604, 605, 606, 607, 608, 609, 612, 613 have been implemented in accordance with first rule 401 of set of rules 400, described above.

Next, at an operation 614, network controller 102 provides or transmits the new encryption key public value (a2-pub) for first network element 110 to second network element 120. Also, at an operation 615, network controller 102 provides or transmits the new encryption key public value (b2-pub) for second network element 120 to first network element 110. Upon obtaining or receiving the new encryption key public value for its peer network element from network controller 102, each network element 110, 120 generates two sets of new security associations using the new encryption key public value and each of its own encryption keys. For example, upon obtaining or receiving the new encryption key public value (a2-pub), at an operation 617, second network element 120 generates and stores a first set of new security associations (Tx (b1-a2), Rx (a2-b1)) to use for protecting traffic between second network element 120 and first network element 110 based on the new encryption key public value (a2-pub) for first network element 110 and the previous encryption keys (b1) for second network element 120. In this embodiment, second network element 120 also generates and stores a second set of new security associations (Tx (b2-a2), Rx (a2-b2)) to use for protecting traffic between second network element 120 and first network element 110 based on the new encryption key public value (a2-pub) for first network element 110 and the new encryption keys (b2) for second network element 120.

First network element 110 performs similar operations with the new encryption key public value (b2-pub) for second network element 120. For example, upon obtaining or receiving the new encryption key public value (b2-pub), at an operation 616, first network element 110 generates and stores a first set of new security associations (Tx (a1-b2), Rx (b2-a1)) to use for protecting traffic between first network element 110 and second network element 120 based on the new encryption key public value (b2-pub) for second network element 120 and the previous encryption keys (a1) for first network element 110. In this embodiment, first network element 110 also generates and stores a second set of new security associations (Tx (a2-b2), Rx (b2-a2)) to use for protecting traffic between first network element 110 and second network element 120 based on the new encryption key public value (b2-pub) for second network element 120 and the new encryption keys (a2) for first network element 110.

At this point, first network element 110 has a current state 618 that includes both of its local encryption keys (a1, a2), both peer encryption key public values (b1-pub, b2-pub) for second network element 120, and four sets of security associations (e.g., Tx (a1-b1), Rx (b1-a1);Tx (a2-b1), Rx (b1-a2); Tx (a1-b2), Rx (b2-a1); and Tx (a2-b2), Rx (b2-a2)). Second network element 120 has a current state 619 that includes both of its local encryption keys (b1, b2), both peer encryption key public values (a1-pub, a2-pub) for first network element 110, and four sets of security associations (e.g., Tx (b1-a1), Rx (a1-b1); Tx (b1-a2), Rx (a2-b1); Tx (b2-a1), Rx (a1-b2); and Tx (b2-a2), Rx (a2-b2)).

Encrypted communication between each network element 110, 120 is initially conducted using the set of new security associations generated using the peer network element's new encryption key public value and the local network element's previous encryption keys. For example, as shown in FIG. 6, first network element 110 provides an IPsec ESP packet to second network element 120 at an operation 620 that is protected using an outbound security association from the first set of new security associations (e.g., Tx (a1-b2)) based on the previous encryption keys (a1) for first network element 110 and the new encryption key public value (b2-pub) for second network element 120. Similarly, second network element 120 provides an IPsec ESP packet to first network element 110 at an operation 621 using an outbound security association from the first set of new security associations (e.g., Tx (b1-a2)) based on previous encryption keys (b1) for second network element 120 and the new encryption key public value (a2-pub) for first network element 110. In this embodiment, operations 616, 617, 620, 621 have been implemented in accordance with second rule 402 of set of rules 400, described above.

Meanwhile, at first network element 110, upon obtaining or receiving encrypted communication provided from second network element 120 at operation 621 that uses a security association from the first set of new security associations (Tx (a2-b1), Rx (b1-a2)), first network element 110 can begin to use the security associations associated with its new encryption keys (e.g., a2) and with the new encryption key public value for second network element 120 (e.g., b2). Subsequent encrypted communication between first network element 110 and second network element 120 is conducted using the second set of new security associations (Tx (a2-b2), Rx (b2-a2)) to protect traffic. For example, as shown in FIG. 6, first network element 110 sends an IPsec ESP packet at an operation 622 using the outbound security association from the second set of new security associations (e.g., Tx (a2-b2)).

At second network element 120, a similar process occurs. Upon obtaining or receiving encrypted communication provided from first network element 110 at operation 620 that uses a security association (e.g., Tx (a1-b2)) from the first set of new security associations (Tx (a1-b2), Rx (b2-a1)), second network element 120 can begin to use the security associations associated with its new encryption keys (e.g., b2) and with the new encryption key public value for first network element 110 (e.g., a2) to protect traffic. Subsequent encrypted communication between second network element 120 and first network element 110 is conducted using the second set of new security associations (Tx (b2-a2), Rx (a2-b2)). For example, as shown in FIG. 6, second network element 120 sends an IPsec ESP packet at an operation 624 using the outbound security association from the second set of new security associations (e.g., Tx (b2-a2)). In this embodiment, operations 620, 621 have been implemented in accordance with third rule 403 of set of rules 400, described above.

Additionally, each network element 110, 120 may set one or more timers. For example, first network element 110 may set a timer at an operation 626 to remove all security associations based on the previous encryption key public value (b1-pub) for second network element 120, for example, in accordance with fourth rule 404. First network element 110 may also set another timer at operation 626 to remove all security associations based on the previous local public-key encryption keys (a1) for first network element 110, for example, in accordance with third rule 403. Upon expiration of the timers, all previous sets of security associations (Tx (a1-b1), Rx (b1-a1); Tx (a2-b1), Rx (b1-a2); and Tx (a1-b2), Rx (b2-a1)) stored at first network element 110 that are associated with the previous encryption keys (a1, b1) are deleted or deactivated at an operation 628. Upon expiration of the timers set at operation 626 and the deletion or deactivation of the previous set of security associations at operation 628, first network element 110 has a final state 630 that includes its new local encryption keys (a2), peer new encryption key public value (b2-pub) for second network element 120, and the second set of new security associations (Tx (a2-b2), Rx (b2-a2)).

At second network element 120, upon obtaining or receiving encrypted communication provided from first network element 110 at operation 622 that uses a security association (e.g., Tx (b2-a2)) from the second set of new security associations (Tx (b2-a2), Rx (a2-b2)), second network element 120 may delete or deactivate all previous sets of security associations (Tx (b1-a1), Rx (a1-b1); Tx (b2-a1), Rx (a1-b2); and Tx (b1-a2), Rx (a2-b1)) stored at second network element 120 that are associated with the previous encryption keys (a1, b1) at an operation 627. As described above, in some embodiments, second network element 120 may set one or more timers at an operation 625 prior to deleting or deactivating the previous set of security associations at operation 627. Upon expiration of the timers, operation 627 may proceed.

Upon expiration of the timers set at operation 625 and the deletion or deactivation of the previous set of security associations at operation 627, second network element 120 has a final state 632 that includes its new local encryption keys (b2), peer new encryption key public value (a2-pub) for first network element 110, and the second set of new security associations (Tx (b2-a2), Rx (a2-b2)). In this embodiment, operations 625, 626, 627, 628 have been implemented in accordance with fourth rule 404 of set of rules 400, described above. As shown in FIG. 6, both first network element 110 and second network element 120 reach corresponding final states 630, 632 that include the new encryption keys for each network element 110, 120 and the associated sets of new security associations using the new encryption keys. Thus, encryption key rollover synchronization in network 100 is achieved for a simultaneous rollover or rekeying event (i.e., rollover of encryption keys for first network element 110 and second network element 120).

In some embodiments, multiple network elements may initiate a rekey or rollover that is overlapping, but not necessarily simultaneous. In these situations, each network element may proceed according to the operations described in reference to method 500 of FIG. 5, described above, with the additional steps of creating sets of intermediate security associations at each network element that use the local network element's previous public-key encryption keys and a peer network element's new encryption key public value. For example, in the event that first network element 110 and second network element 120 initiate overlapping, but not simultaneous, rekeying or rollover of their public-key encryption keys, each network element will generate a set of intermediate security associations to use for protecting traffic until the rekeying or rollover is complete.

In this scenario, first network element 110 generates a set of intermediate security associations using its previous public-key encryption keys (e.g., a1) and the new encryption key public value for second network element 120 (e.g., b2-pub) received from network controller 102, (i.e., Tx (a1-b2) and Rx (b2-a1)). Similarly, second network element 120 also generates a set of intermediate security associations using its previous public-key encryption keys (e.g., b1) and the new encryption key public value for first network element 110 (e.g., a2-pub) received from network controller 102, (i.e., Tx (b1-a2) and Rx (a2-b1)). These sets of intermediate security associations may be used by first network element 110 and second network element 120 to protect traffic between first network element 110 and second network element 120 until both network elements have completed rekeying/rollover and has observed that the other network element is using a security association from the new set of security associations generated based on the new public-key encryption keys for both network elements.

With reference to FIG. 7, a flowchart is illustrated of a method 700 for implementing techniques for encryption key rollover synchronization in a network, according to an example embodiment. In one embodiment, method 700 may begin upon the initiation of a rekeying or rollover of public-key encryption keys at one or more network elements in a network. At an operation 702, a new set of public-key encryption keys are generated for a first network element, for example, first network element 110 in network 100.

At an operation 704, based on the new set of public-key encryption keys, a set of new security associations is generated for protecting traffic between the first network element and each other network element of the plurality of network elements in the network. For example, as described above in reference to FIG. 1, first network element 110 may generate a set of new security associations 118 between first network element 110 and second network element 120 using new public-key encryption keys 116.

At an operation 706, the first network element provides a new public key from its new set of public-key encryption keys to a network controller in communication with the plurality of network elements. For example, as shown in FIG. 1, first network element 110 provides its new encryption key public value (a2-pub) 117 to network controller 102.

At an operation 708, the first network element uses security associations associated with a previous set of encryption keys to send or provide traffic to each other network element in the network for encrypted communication between the first network element and each other network element. For example, as shown in FIG. 1, an encrypted communication between first network element 110 and second network element 120 is protected using an outbound security association 130 (Tx (a1-b1)) from first network element 110 that is associated with set of security associations 114 using the previous set of public-key encryption keys (a1) 112.

Method 700 may further include an operation 710, where, upon obtaining from a second network element of the plurality of network elements, traffic protected by a security association from the set of new security associations, the first network element begins using the new security associations for subsequent encrypted communication between the first network element and the second network element. For example, as shown in FIG. 2, an encrypted communication between second network element 120 and first network element 110 uses an outbound security association 202 (Tx (b1-a2)) from second network element 120 that is associated with new set of security associations 200 using new encryption key public value (a2-pub) 117 for first network element 110. Accordingly, once first network element 110 observes the communication using outbound security association 202 (Tx (b1-a2)), first network element 110 may begin using an outbound security association 204 (Tx (a2-b1)) that is associated with new set of security associations 118 also using the new public-key encryption keys (a2) 116 for first network element 110 to protect traffic for subsequent encrypted communication with second network element 120.

In this embodiment, method 700 has been described in relation to two network elements in a network, where one network element has initiated a rekeying or rollover of its encryption keys. However, it should be understood that method 700 may be repeated for each combination of network elements in a network that includes a plurality of network elements. With this arrangement, techniques for encryption key rollover synchronization in a network may be provided.

Figure 8:
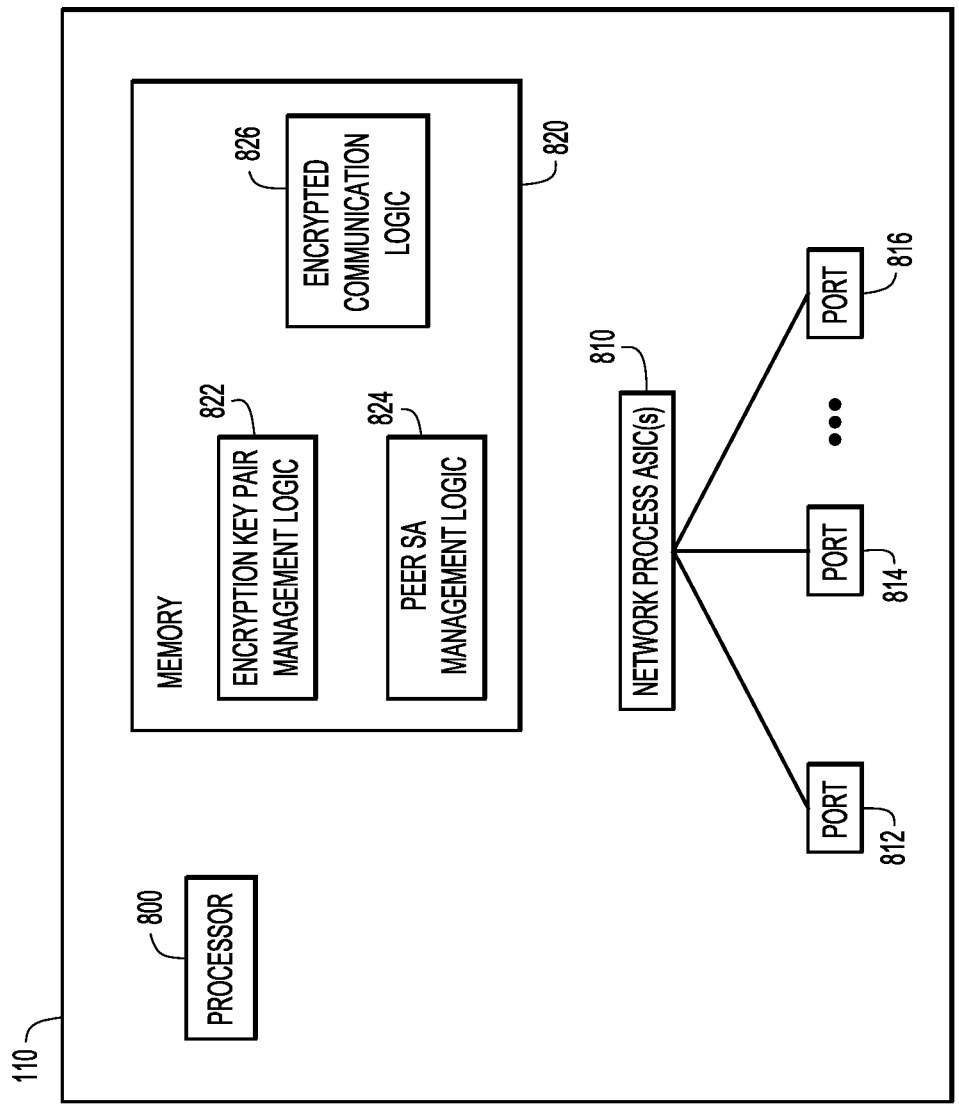
FIG. 8 is a block diagram of an apparatus for implementing techniques for encryption key rollover synchronization in a network, according to an example embodiment.

With reference to FIG. 8, an example block diagram is shown of a network element, e.g., first network element 110, configured to perform techniques for encryption key rollover synchronization described herein in connection with FIGS. 1-7. In this embodiment, first network element 110 includes a processor 800 for processing information and may further include a bus (not shown) or other communication mechanism coupled with processor 800 for communicating the information. First network element 110 also includes a Network Processor application specific integrated circuit (ASIC) 810 and a plurality of ports 812, 814, 816, and a memory 820. The Network Processor ASIC 810 performs any of a variety of networking functions (routing, switching, network address translation, etc.). Network Processor ASIC 810 may also be referred to herein as a network processor unit that performs one or more networking functions for packets received at the plurality of ports 812, 814, 816 and to be sent from the ports. Network Processor ASIC 810, may, for example, include one or more line cards configured to enable network communications and permit the plurality of ports 812, 814, 816 to receive inbound packets and to send outbound packets. While the figure shows a single block 800 for a processor, it should be understood that the processor 800 may represent a plurality of processing cores, each of which can perform separate processing.

In this embodiment, memory 820 may be read only memory (ROM), random access memory (RAM), magnetic disk storage media devices, optical storage media devices, flash memory devices, electrical, optical, or other physical/tangible memory storage devices. Thus, in general, memory 820 may comprise one or more tangible (non-transitory) computer readable storage media (e.g., a memory device) encoded with software comprising computer executable instructions and when the software is executed (by the processor 800) it is operable to perform the operations described herein. For example, one or more of encryption key pair management logic 822, peer security association (SA) management logic 824, and encrypted communication logic 826 is stored in memory 820 for providing one or more of the functions of first network element 110 described herein. In particular, encryption key pair management logic 822 may cause first network element 110 to perform operations associated with generating and managing public-key encryption keys described above in connection with FIGS. 1-7 when executed by processor 800 from memory 820, including, for example, executing operations of encryption key pair management module 300, described above.

Similarly, peer SA management logic 824 may cause first network element 110 to perform the peer SA management operations (e.g., generating and managing sets of security associations) described above in connection with FIGS. 1-7 when executed by processor 800 from memory 820, including, for example, executing one or more operations of peer management module 310, set of peer SA management modules 312, and/or each peer SA management module 314, 316, 318, described above. Additionally, encrypted communication logic 826 may cause first network element 110 to perform various encrypted communication operations, such as providing/transmitting traffic using outbound security associations, obtaining/receiving traffic using inbound security associations, and encrypting traffic (e.g., data packets or datagrams) for encrypted communication between network elements, as described above in the previous embodiments, as well as other known operations.

In addition, memory 820 may be used for storing temporary variables or other intermediate information during the execution of instructions by processor 800. Additionally, in some embodiments, one or more functions of first network element 110, encryption key pair management logic 822, peer SA management logic 824, and encrypted communication logic 826 may be performed by Network Processor ASIC 810.

In summary, the present embodiments described herein provide techniques for encryption key rollover synchronization in a network. Network elements use a network controller to distribute encryption key public values and use a specific encryption key public value rollover process described herein to ensure that packets are not dropped within the network during the rollover period, although each peer network element using the new encryption key public value will react to the rollover process on its own schedule. The techniques for encryption key rollover synchronization according to the example embodiments keep track of what has been distributed by each peer network element and an observation of which encryption key public values have been used by received encrypted communications generated by corresponding security associations.

The example embodiments include rules for a network element to follow when it is performing its own rollover of encryption keys, as well as when it is reacting to a rollover of encryption keys from peer network elements. With this arrangement, techniques for encryption key rollover synchronization in a network may be provided.

In summary, a method is provided comprising: generating a new set of public-key encryption keys for a first network element in a network comprising a plurality of network elements; based on the new set of public-key encryption keys, generating a set of new security associations between the first network element and each other network element of the plurality of network elements in the network; providing a new public key from the new set of public-key encryption keys for the first network element to a network controller in communication with the plurality of network elements; using security associations associated with a previous set of public-key encryption keys to protect traffic for encrypted communication between the first network element and each other network element in the network; and upon obtaining, from a second network element of the plurality of network elements, traffic protected by a security association from the set of new security associations, using security associations from the set of new security associations for subsequent encrypted communication between the first network element and the second network element.

In another form, a non-transitory computer readable storage media encoded with instructions is provided that, when executed by a processor of a first network element in a network comprising a plurality of network elements, cause the processor to: generate a new set of public-key encryption keys for the first network element; based on the new set of public-key encryption keys, generate a set of new security associations between the first network element and each other network element of the plurality of network elements in the network; provide a new public key from the new set of public-key encryption keys for the first network element to a network controller in communication with the plurality of network elements; use security associations associated with a previous set of public-key encryption keys to protect traffic for encrypted communication between the first network element and each other network element; and upon obtaining, from a second network element of the plurality of network elements, traffic protected by a security association from the set of new security associations, use security associations from the set of new security associations for subsequent encrypted communication between the first network element and the second network element.

Furthermore, an apparatus is provided comprising: at least one network port for communicating in a network; a memory; a processor coupled to the memory and to the at least one network port, wherein the processor is configured to: generate a new set of public-key encryption keys for the apparatus; based on the new set of public-key encryption keys, generate a set of new security associations between the apparatus and each network element of a plurality of network elements in the network; provide a new public key from the new set of public-key encryption keys for the apparatus to a network controller in communication with the plurality of network elements; use security associations associated with a previous set of encryption keys to protect traffic for encrypted communication between the apparatus and each network element of the plurality of network elements; and upon obtaining, from a first network element of the plurality of network elements, a security association from the set of new security associations, use security associations from the set of new security associations for subsequent encrypted communication between the apparatus and the first network element.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    generating a new set of public key encryption keys for a first network element in a network comprising a plurality of network elements;
    based on the new set of public-key encryption keys, generating a set of new security associations between the first network element and each other network element of the plurality of network elements in the network;
    providing a new public key from the new set of public-key encryption keys for the first network element to a network controller in communication with the plurality of network elements;
    using security associations associated with a previous set of public-key encryption keys to protect traffic for encrypted communication between the first network element and each other network element in the network; and
    upon obtaining, from a second network element of the plurality of network elements, traffic protected by a security association from the set of new security associations, using security associations from the set of new security associations for subsequent encrypted communication between the first network element and the second network element,
    wherein the first network element and the second network element exchange peer-to-peer encrypted communication directly without passing through the controller, and only the network controller distributes public key cryptographic material on behalf of the first network element to the second network element.

2. The method of claim 1, further comprising:
    obtaining from the network controller, at the first network element, a new public key from a new set of public-key encryption keys for one or more network elements of the plurality of network elements;
    based on the new public key for the one or more network elements, generating another set of new security associations between the first network element and each of the one or more network elements; and
    using security associations from the another set of new security associations to protect traffic for subsequent encrypted communication between the first network element and each of the one or more network elements.

3. The method of claim 2, further comprising:
    upon obtaining encrypted communication, at the first network element, from the one or more network elements using a security association from the another set of new security associations, deactivating security associations associated with previous public keys for each of the one or more network elements.

4. The method of claim 1, further comprising:
    obtaining encrypted communication, at the first network element, from at least one network element of the plurality of network elements, wherein the encrypted communication uses a security association from the set of new security associations; and
    using security associations from the set of new security associations to protect traffic for subsequent encrypted communication between the first network element and the at least one network element.

5. The method of claim 4, further comprising:
    deactivating, at the first network element, security associations associated with the previous set of public-key encryption keys for the first network element for subsequent encrypted communication between the first network element and the at least one network element.

6. The method of claim 4, further comprising:
    setting a timer, at the first network element, upon obtaining the encrypted communication that uses a security association from the set of new security associations; and
    upon expiration of the timer, deleting the security associations associated with the previous set of public-key encryption keys for the first network element.

7. The method of claim 1, further comprising:
    obtaining from the network controller, at the first network element, a new public key from a new set of public-key encryption keys for the second network element; and
    wherein the set of new security associations comprises:
        a first set of new security associations between the first network element and the second network element based on the new set of public-key encryption keys for the first network element and the new public key for the second network element; and
        a second set of new security associations between the first network element and the second network element based on the previous set of public-key encryption keys for the first network element and the new public key for the second network element.

8. One or more non-transitory computer readable storage media encoded with instructions that, when executed by a processor of a first network element in a network comprising a plurality of network elements, cause the processor to:
    generate a new set of public-key encryption keys for the first network element;
    based on the new set of public-key encryption keys, generate a set of new security associations between the first network element and each other network element of the plurality of network elements in the network;
    provide a new public key from the new set of public-key encryption keys for the first network element to a network controller in communication with the plurality of network elements;
    use security associations associated with a previous set of public-key encryption keys to protect traffic for encrypted communication between the first network element and each other network element in the network; and
    upon obtaining, from a second network element of the plurality of network elements, traffic protected by a security association from the set of new security associations, use security associations from the set of new security associations for subsequent encrypted communication between the first network element and the second network element,
wherein the first network element and the second network element exchange peer-to-peer encrypted communication directly without passing through the controller, and only the network controller distributes public key cryptographic material on behalf of the first network element to the second network element.

9. The one or more non-transitory computer readable storage media of claim 8, further comprising instructions to cause the processor to:
obtain from the network controller a new public key from a new set of public-key encryption keys for one or more network elements of the plurality of network elements;
based on the new public key for the one or more network elements, generate another set of new security associations between the first network element and each of the one or more network elements; and
use security associations from the another set of new security associations to protect traffic for subsequent encrypted communication between the first network element and each of the one or more network elements.

10. The one or more non-transitory computer readable storage media of claim 9, further comprising instructions to cause the processor to:
upon obtaining encrypted communication from the one or more network elements using a security association from the another set of new security associations, deactivate security associations associated with previous public keys for each of the one or more network elements.

11. The one or more non-transitory computer readable storage media of claim 8, further comprising instructions to cause the processor to:
obtain encrypted communication from at least one network element of the plurality of network elements, wherein the encrypted communication uses a security association from the set of new security associations; and
use security associations from the set of new security associations to protect traffic for subsequent encrypted communication between the first network element and the at least one network element.

12. The one or more non-transitory computer readable storage media of claim 11, further comprising instructions to cause the processor to:
deactivate security associations associated with the previous set of public-key encryption keys for the first network element for subsequent encrypted communication between the first network element and the at least one network element.

13. The one or more non-transitory computer readable storage media of claim 11, further comprising instructions to cause the processor to:
set a timer upon obtaining the encrypted communication that uses a security association from the set of new security associations; and
upon expiration of the timer, delete the security associations associated with the previous set of public-key encryption keys for the first network element.

14. The one or more non-transitory computer readable storage media of claim 8, further comprising instructions to cause the processor to:
obtain from the network controller a new public key from a new set of public-key encryption keys for the second network element; and
wherein the set of new security associations comprises:
a first set of new security associations between the first network element and the second network element based on the new set of public-key encryption keys for the first network element and the new public key for the second network element; and
a second set of new security associations between the first network element and the second network element based on the previous set of public-key encryption keys for the first network element and the new public key for the second network element.

15. An apparatus comprising:
at least one network port for communicating in a network;
a memory;
a processor coupled to the memory and to the at least one network port, wherein the processor is configured to:
generate a new set of public-key encryption keys for the apparatus;
based on the new set of public-key encryption keys, generate a set of new security associations between the apparatus and each network element of a plurality of network elements in the network;
provide a new public key from the new set of public-key encryption keys for the apparatus to a network controller in communication with the plurality of network elements;
use security associations associated with a previous set of public-key encryption keys to protect traffic for encrypted communication between the apparatus and each network element of the plurality of network elements; and
upon obtaining, from a first network element of the plurality of network elements, traffic protected by a security association from the set of new security associations, use security associations from the set of new security associations for subsequent encrypted communication between the apparatus and the first network element,
wherein the first network element and the second network element exchange peer-to-peer encrypted communication directly without passing through the controller, and only the network controller distributes public key cryptographic material on behalf of the first network element to the second network element.

16. The apparatus of claim 15, wherein the processor is further configured to:
obtain from the network controller a new public key from a new set of public-key encryption keys for one or more network elements of the plurality of network elements;
based on the new public key for the one or more network elements, generate another set of new security associations between the apparatus and each of the one or more network elements; and
use security associations from the another set of new security associations to protect traffic for subsequent encrypted communication between the apparatus and each of the one or more network elements.

17. The apparatus of claim 16, wherein the processor is further configured to:
upon obtaining encrypted communication from the one or more network elements using a security association from the another set of new security associations, deactivate security associations associated with previous public keys for each of the one or more network elements.

18. The apparatus of claim 15, wherein the processor is further configured to:
   obtain encrypted communication from at least one network element of the plurality of network elements, wherein the encrypted communication uses a security association from the set of new security associations; and
   use security associations from the set of new security associations to protect traffic for subsequent encrypted communication between the apparatus and the at least one network element.

19. The apparatus of claim 18, wherein the processor is further configured to:
   deactivate security associations associated with the previous set of public-key encryption keys for the apparatus for subsequent encrypted communication between the apparatus and the at least one network element.

20. The apparatus of claim 18, wherein the processor is further configured to:
   set a timer upon obtaining the encrypted communication that uses a security association from the set of new security associations; and
   upon expiration of the timer, delete the security associations associated with the previous set of public-key encryption keys for the apparatus.

* * * * *